United States Patent
Goh et al.

(10) Patent No.: US 8,680,892 B2
(45) Date of Patent: Mar. 25, 2014

(54) RESET PULSE ENCODING AND DECODING SCHEME WITH NO INTERNAL CLOCK

(75) Inventors: Beng-Heng Goh, Singapore (SG); Yann Desprez-Le-Goarant, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 329 days.

(21) Appl. No.: 13/172,685

(22) Filed: Jun. 29, 2011

(65) Prior Publication Data

US 2013/0002316 A1    Jan. 3, 2013

(51) Int. Cl.
   *H03K 3/00*    (2006.01)

(52) U.S. Cl.
   USPC .......................................... 327/108

(58) Field of Classification Search
   None
   See application file for complete search history.

(56) References Cited

U.S. PATENT DOCUMENTS

| | | |
|---|---|---|
| 5,675,271 A | 10/1997 | Baqai et al. |
| 2009/0256597 A1* | 10/2009 | Har et al. ...................... 327/143 |

* cited by examiner

*Primary Examiner* — Daniel Rojas
(74) *Attorney, Agent, or Firm* — Hogan Lovells US LLP

(57) ABSTRACT

An integrated circuit (IC) provides a reset function. The IC receives a command that is defined by a first sequence of counts of signal transitions of a first signal during windows of a second signal and provides a reset function when it is determined that the command is received. A device including the IC and a system including the device are provided.

16 Claims, 3 Drawing Sheets

RESET PULSE ENCODING AND DECODING SCHEME WITH NO INTERNAL CLOCK

BACKGROUND

This invention relates to an integrated circuit (IC) that is able to effect a function based on a command sent to it, a subsystem including the IC, a system including the subsystem and an associated method of effecting the function. More particularly, this invention relates to an integrated circuit (IC), a subsystem including the IC, a system including the subsystem and a method for effecting a reset function without the use of a separate reset input of the IC.

During normal mode or test mode operation of some ICs, the occurrence of errors may cause the ICs to freeze and lock up, and error recovery mechanisms may not always work. In such situations, it is desirable to perform a "reset" to put the ICs back into a normal condition or initial state. If such an IC is coupled to a controller, the controller typically sends a reset signal to a dedicated reset input of the IC to reset the IC. However, not all ICs have a reset input for receiving such an external reset signal. For ICs that do not have a reset input, a number of approaches are available for resetting the IC. One approach is to remove and restore power to the IC to make the IC reset. However, such an approach requires the IC hardware to be shut down and powered up again, resulting in the IC taking a significant period of time to recover. In a test mode, such a long recovery time adds to the testing time of the IC and, as a result, increases the cost of testing the IC.

U.S. Pat. No. 5,675,271, Baqai, entitled "Extended Chip Select Reset Apparatus and Method" discloses another approach for resetting an IC without the need for a separate reset input. A chip select line of the IC is used for resetting the IC instead. To reset the IC, a controller coupled to the IC maintains the chip select line in an active state for at least a predetermined length of time corresponding to a number of data clocks. When such a state is detected by the IC, a reset signal is generated internally to reset the IC. Such an approach does not require the IC to be shut down and powered up again, thus reducing its recovery time.

There is, however, a need to at least provide an alternate approach to resetting an IC that may prove to be more robust than the approach disclosed in U.S. Pat. No. 5,675,271.

BRIEF DESCRIPTION OF DRAWINGS

The invention will be better understood with reference to the drawings, in which.

DETAILED DESCRIPTION

Figure 1:
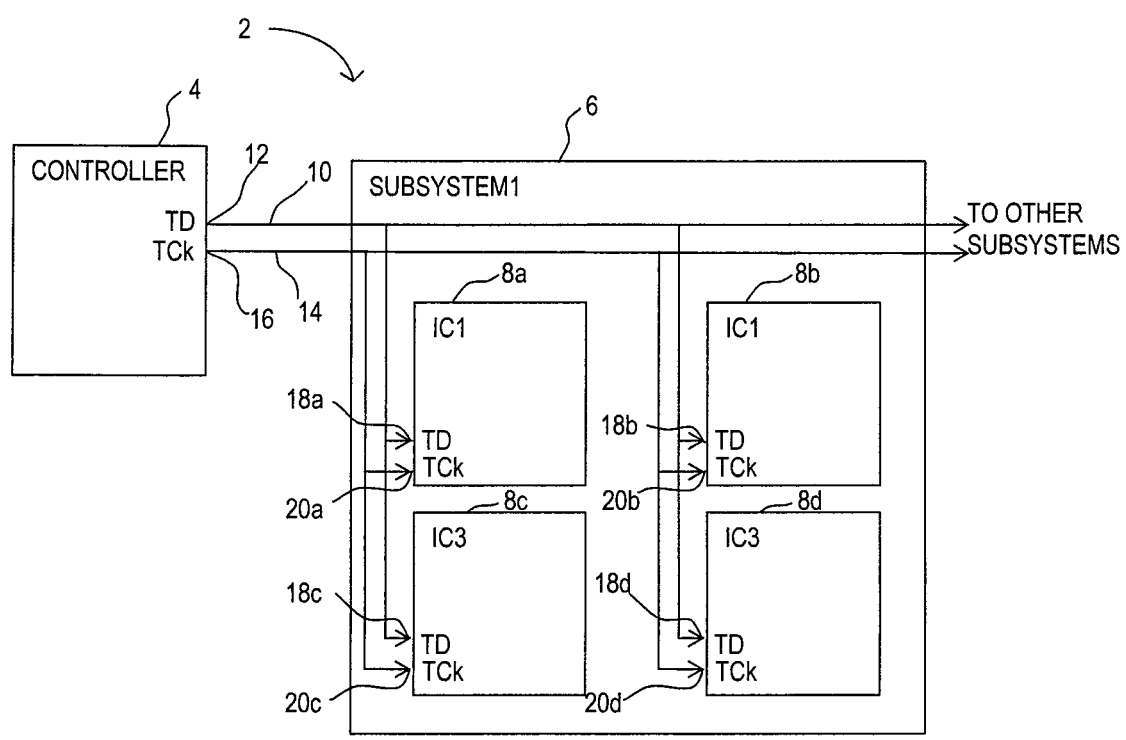
FIG. 1 is a block diagram of a system including a controller and a subsystem having several integrated circuits (ICs), each of which is able to effect a reset function according to an embodiment of the invention.
Figure 2:
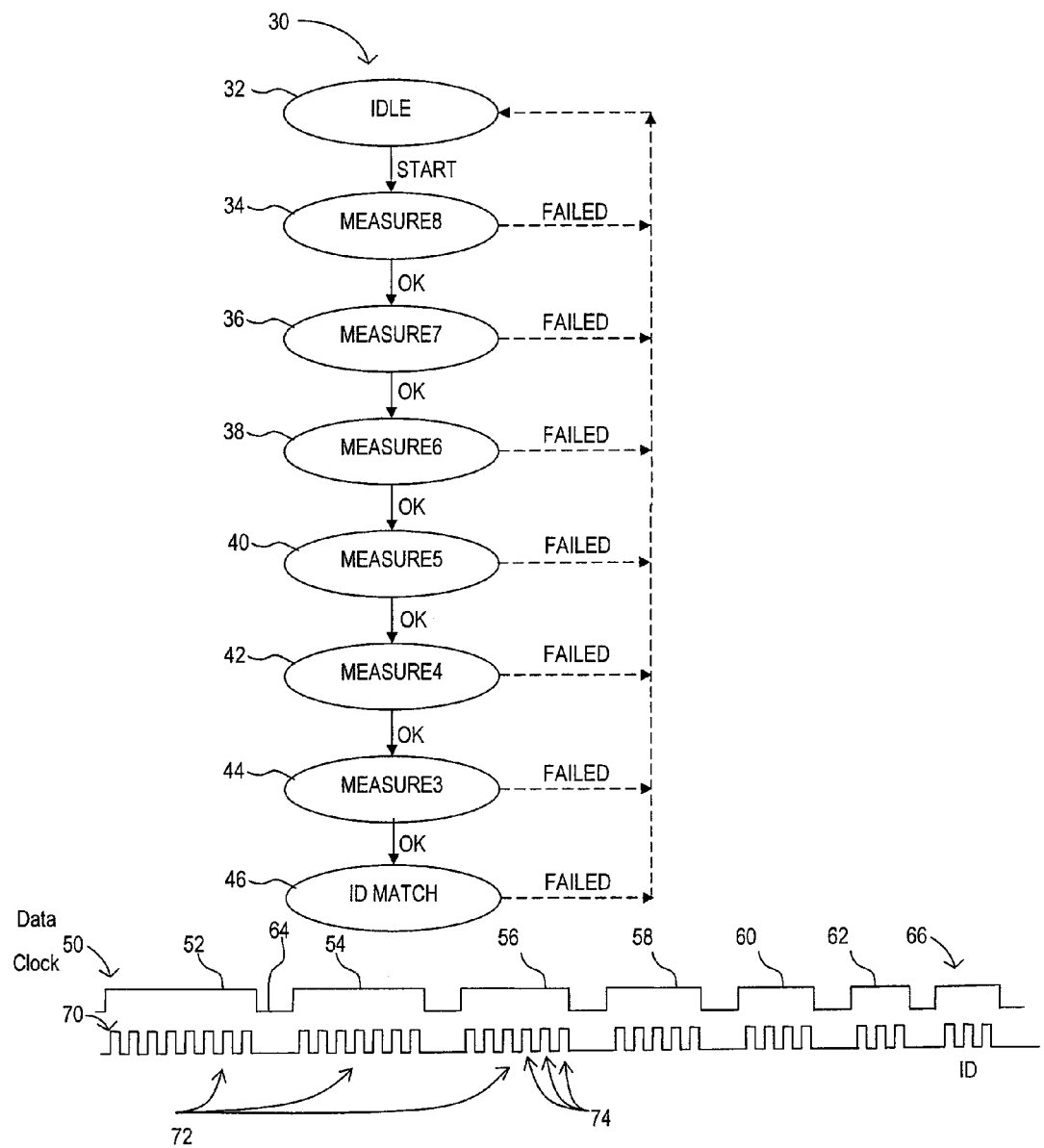
FIG. 2 is a state transition diagram and a corresponding timing diagram detailing the operation of an IC in FIG. 1.
Figure 3:
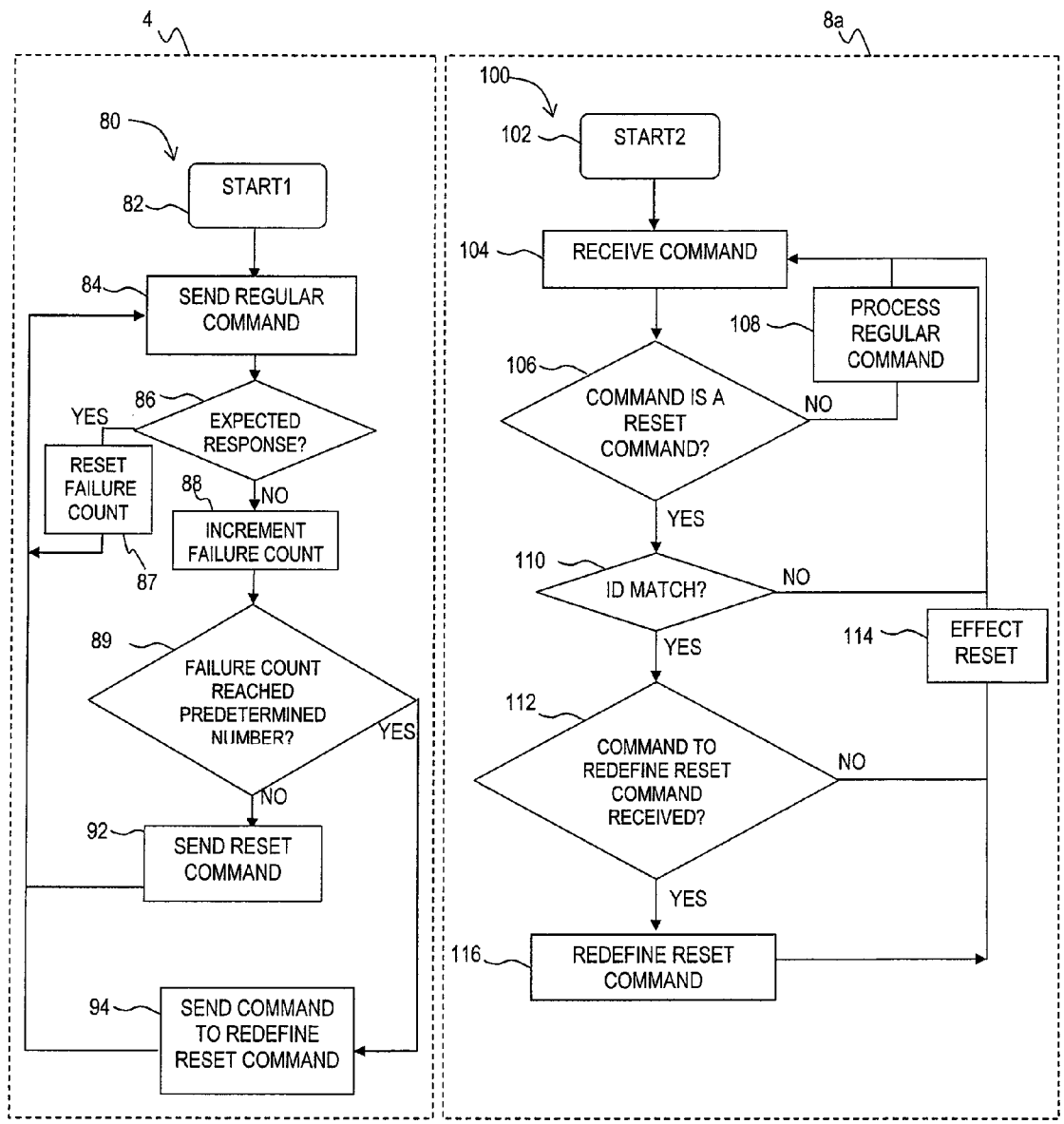
FIG. 3 is a flowchart showing a sequence of steps in the system in FIG. 1 for effecting the reset function.

As shown in the drawings for purposes of illustration, the invention may be embodied in an integrated circuit (IC) 8a-8d that is able to effect a function of a subsystem 6. The function may for example include, but is not limited to, a reset function without involving a dedicated reset input of the ICs 8a-8d. Referring to FIGS. 1 to 3, each of the ICs 8a-8d generally includes circuitry for receiving a command that is defined by a first sequence of counts of signal transitions of a first signal 70 (FIG. 2) during windows 52-62 of a second signal 50 and circuitry for effecting the function when it is determined that the command is received. The invention may also be embodied in the subsystem 6 including the ICs 8a-8d, a system 2 including the subsystem 6 and a method of effecting the function.

FIG. 1 is a block diagram of the system 2 including a controller 4 and the subsystem 6. The subsystem 6 may be, but is not limited to, an imaging device and a serial flash. The controller 4 and the subsystem 6 are connected to each other for simplex, half-duplex or full-duplex communication. The subsystem 6 includes a number of ICs 8a-8d. A data signal path 10 couples a transmit output 12 of the controller 4 to respective receiver inputs 18a-18d of the ICs 8a-8d. A clock signal path 14 couples a transmitter clock output 16 of the controller 4 to respective receiver clock inputs 20a-20d of the ICs 8a-8d.

The operation of the IC 8a will be described next. It should be understood that the other ICs 8b-8d operate in a similar manner to IC 8a. During operation of the subsystem 4, the controller 4 sends different commands serially to each IC 8a-8d over the data signal path 10. The IC 8a receives data representing the commands in accordance with the clock signal that is also transmitted by the controller 4 over the clock signal path 14. In addition to receiving the command, the IC 8a also receives an identity (address) 66 (FIG. 2). The IC 8a processes each command that is received when it determines that the command is directed to it and it responds to the controller 4 accordingly. When the controller 4 detects that something might be or is amiss with the IC 8a, such as when there is a failure by the IC 8a to respond within a timeout period, the controller 4 initiates the resetting of the IC 8a. To reset the IC 8a, the controller 4 outputs the data signal 50 (FIG. 2) on the data signal path 10. This data signal 50 includes a pulse train having first pulses 52-62 of decreasing durations or marks. These first pulses 52-62 are separated by a duration known as a space 64. In this embodiment, the data signal 50 may include six pulses 52-62 having durations of, for example, 8 msec, 7 msec, 6 msec, 5 msec, 4 msec and 3 msec respectively, although pulses 52-62 of other durations may also be used. The pulse separation 64 between the pulses 52-62 may, for example, be 2 msec. The controller 4 also outputs the clock signal 70 on the clock signal path 14. This clock signal 70 includes bursts 72 of second pulses 74 that coincide with the first pulses 52-62 of the data signal 50. The frequency of the second pulses 74 in each burst 72 is set, for example, at 1 KHz. That is, the period of each second pulse 74 is 1 msec. During the period of the 8 msec first pulse 52 of the data signal 50, there will be eight second pulses 74 of the clock signal 70. Likewise, for each of the other first pulses 54-62 of the data signal 50, there will be a number of second pulses 74 of the clock signal 70 corresponding to the duration of each first pulse 52-62. The combination of the data signal 50 and the clock signal 70, therefore, defines a reset command or signature that is sent by the controller 4 to the IC 8a for resetting the IC 8a.

The operation of the IC 8a in accordance with a first embodiment is described in detail next with the aid of FIG. 2. In this first embodiment, the IC 8a may be a circuit that implements a state transition machine 30 for monitoring the data signal path 10 and clock signal path 14 for the data signal 50 and the clock signal 70 respectively that correspond to the reset command. During power up, the IC 8a initializes the state transition machine 30 to an IDLE state 32. The IC. 2a constantly monitors the data signal path 10 for a positive transition of the data signal 50. Such a transition indicates the start of a window during which the signal transitions in the clock signal 70 are counted. If the IC 8a detects a positive transition of the data signal 70, the IC 8a transitions the state transition machine 30 to a "MEASURE8" state 34, wherein the IC 8a starts to count the number of transitions in the clock signal 70. The IC 8a continues to count the number of transitions of the clock signal 70 until it detects a negative transition of the data signal 50 that marks the end of the MEASURE8 window 52. The IC 8a may count only positive or negative transitions, or both positive and negative transitions of the clock signal 70. If it is determined during the MEASURE8 window 52 that there are eight positive transitions in the clock signal 70, the IC 8a transitions the state transition machine 30 to a next "MEASURE7" state 36. If it is however determined during the MEASURE8 window 52 that there are more than or less than eight positive transitions in the clock signal 70, the IC 8a returns the state transition machine 30 to the IDLE state 32. In the MEASURE7 state 36, the IC 8a waits for the arrival of the MEASURE7 window 54 and similarly counts the number of transitions of the clock signal 70 during window 54. Again, if it is determined during this MEASURE7 window 54 that there are less than or more than seven signal transitions, the IC 8a returns the state transition machine 30 to the IDLE state 32. If however in the MEASURE7 state 36, the IC 8a detects the occurrence of seven positive transitions of the clock signal 70, the IC 8a transitions the state transition machine 30 to a next MEASURE6 state 38, where the IC 8a counts the number of positive transitions of the clock signal 70 in a MEASURE6 window 56. In this manner, the IC 8a transitions the state transition machine 30 from a MEASURE state 34-44 either back to the IDLE state 32 or a subsequent MEASURE state 34-44 depending on whether the number of positive transitions of the clock signal 70 detected is what is expected in the window 52-62 associated with that MEASURE state 34-44. If the IC 8a manages to successfully transition through all the MEASURE states 34-44 to an ID MATCH state 46 as shown in FIG. 2, it is confirmed that the data signal 50 and the clock signal 70 correspond to the reset command. That is, the IC 8a is able to determine that the sequence of counts of signal transitions of the clock signal 70 during windows 52-66 of the data signal 50 match the first sequence of counts defining the reset command. In the ID MATCH state 46, the IC 8a determines if its ID matches the identity information 66 in the data signal 50. If the identities do not match, the IC 8a transitions the state transition machine back to the IDLE state 32. However, if the identities match, the IC 8a then effects a reset function. The reset function may be a partial or complete, software and/or hardware reset of the IC 8a.

It should be noted that in this embodiment, the transition counts in the first sequence are in descending order. However, the transition counts may be in an ascending order or no order at all but an arbitrary sequence of counts.

As an improvement to the first embodiment, the controller 4 may determine that the IC 8a is not effecting the reset function after receiving the reset command sent by the controller 4. For example, after sending the reset command to the IC 8a, the controller 4 may send a further command to the IC 8a. If the controller 4 does not receive an appropriate response from the IC 8a, the controller 4 may then deem that the IC 8a has not properly responded to the reset command. In such a case, the controller 4 may send two or more reset commands consecutively to the IC 8a to prompt the IC 8a to redefine the reset command. In other words, the two or more reset commands are sent one after another in an uninterrupted succession without another command between any pairs of reset commands. Redefining the reset command involves using a second sequence of transition counts that is different than the first sequence of transition counts to represent the reset command.

Accordingly, the IC 8a may additionally determine if the reset command is received at least twice consecutively. If that is the case, the IC 8a redefines the reset command by the second sequence of transition counts. In this manner, the sequence of counts that define the reset command is changed and synchronized between the controller 4 and the IC 8a. The controller 4 and the IC 8a may each maintain a list of sequences of counts defining the reset command. When the controller 4 suspects that the IC 8a is not responding to the reset command defined by a particular sequence of counts, the controller 4 and the IC 8a will use the next sequence of counts in the list for the reset command as described above. When the last sequence of counts in the list is used, the controller 4 and the IC 8a will go back to using the first sequence in the list to define the reset command. These sequences may be hard-coded or hardwired into the controller 4 and the IC 8a. Alternatively, the controller 4 may determine the second sequence of counts and provide that second sequence of counts to the IC 8a during operation. For example, the controller 4 may provide the IC 8a with a new sequence of counts just before sending the consecutive reset commands to the IC 8a.

The above method of defining the reset command can be viewed in one of two ways. Firstly, it may be viewed as described above where the data signal 50 includes a sequence of windows 52-62 during which the number of second pulses 74 or transitions in the clock signal 70 may be counted. Alternatively, since the frequency of the clock pulses 74 is known, obtaining the number of second pulses 74 in each window 52-66 can also be viewed as measuring the width of that window 52-62.

The circuit of the IC 8a may for example be obtained by first describing (modeling) and verifying (simulating) the state transition machine 30 using a hardware description language, such as but not limited to VHSIC hardware description language (VHDL) and Verilog. After verification, synthesis tools (not shown) are used to translate the design into the hardware of the circuit. Such a process of obtaining the circuit is well known to those skilled in the art and therefore the details are not provided here.

In another embodiment, the IC 8a may be a microcontroller (not separately shown) that executes program code implementing the state transition machine 30. The manner in which the number of transitions of the clock signal 70 can be counted in each window 52-62 using the microcontroller is next described. The data signal path 10 and the clock signal path 14 may be connected to a first input and a second input of the microcontroller. In one embodiment, the microcontroller can continuously poll the first input to detect the rising edge or positive transition of the data signal 50 that indicates the opening of a MEASURE window 8-52. Once the MEASURE window 52-62 is detected to be opened, the microcontroller can similarly monitor the second input to detect and count the number of positive transitions of the clock signal 70 at the second input. The microcontroller will continue counting the positive transitions of the clock signal 70 until it detects the falling edge of the MEASURE window 52-62. The microcontroller then determines if the count matches what is expected for the particular MEASURE window 52-62.

According to another embodiment, the data signal path 10 and the clock signal path 14 may be connected to an interrupt input and a counter input of the microcontroller respectively. The rising edge of the MEASURE window 52-62 may be used to interrupt the microcontroller to cause it to enter an interrupt service routine, wherein the microcontroller initializes a counter (not shown) associated with the counter input to allow the clock signal 70 to clock the counter. The rising edge of the clock signal 70 increments a counter value. The falling edge of the MEASURE window 52-62 interrupts the microcontroller to cause it to stop the counter from counting. Similarly, the microcontroller then determines if the counter value matches what is expected for the particular MEASURE window 52-62.

Accordingly, the controller 4 in the above-described embodiments performs a first sequence 80 of steps 82-94 as shown in FIG. 3. The first sequence 80 starts in a START1 step 82, wherein the controller 4 initializes a failure count and uses the first sequence of counts for defining the reset command. The first sequence 80 then proceeds to a SEND REGULAR COMMAND step 84, wherein the controller 4 sends a regular command is not a reset command to the IC 8*a*. The first sequence 80 then proceeds to an EXPECTED RESPONSE? decision step 86, wherein the controller 4 determines if the IC 8*a* has provided an expected response. If it is determined that the IC 8*a* has provided an expected response, the first sequence 80 proceeds to a RESET FAILURE COUNT step 87, wherein the controller 4 resets the failure count. The first sequence 80 next returns to the SEND REGULAR COMMAND step 84 for the controller 4 to send a next regular command. If, however, it is determined that the IC 8*a* has not provided an expected response, the first sequence 80 proceeds to a INCREMENT FAILURE COUNT step 88, wherein the controller 4 increments the failure count. The first sequence 80 next proceeds to a FAILURE COUNT REACHED PREDETERMINED NUMBER? decision step 89, wherein the controller 4 determines if the failure count has reached a predetermined number, such as a value of two. If it is determined in this decision step 89 that the failure count has not reached the predetermined number, the first sequence 80 proceeds to a SEND RESET COMMAND step 92, wherein the controller 4 sends the data signal 50 and the clock signal 70 corresponding to the first sequence of counts to the IC 8*a* to attempt to cause the IC 8*a* to effect a reset function. The first sequence 80 next returns to the SEND REGULAR COMMAND step 84, wherein the controller 4 continues to send a regular command to the IC 2*a* expecting that the IC 8*a* to be reset. The first sequence 80 next proceeds to the EXPECTED RESPONSE? decision step 86, wherein the controller 4 once again determines if an expected response from the IC 8*a* has been received. If it is determined in this decision step 86 that an expected response from the IC 8*a* has been received, the first sequence 80 returns to the SEND REGULAR COMMAND step 76, via the RESET FAILURE COUNT step 87, to send a next command to the IC 8*a*. In such a case, the IC 8*a* is deemed to have been properly reset as it is now able to properly respond to the regular command. If however it is determined in the EXPECTED RESPONSE? step 86 that despite the sending of the reset command, the expected response to the regular command has not been received, the first sequence 80 proceeds once again to the INCREMENT FAILURE COUNT step 88, wherein the failure count is incremented. The first sequence 80 next proceed to the FAILURE COUNT REACHED PREDETERMINED NUMBER? decision step 89. This time round, the controller 4 will determine that failure count has reached the predetermined value of two, and the first sequence 80 will now proceed to a SEND COMMAND TO REDEFINE RESET COMMAND step 94, wherein the controller 4 sends the data signal 50 and clock signal 70 representing two consecutive reset commands to the IC 8*a*. In this step 94, the controller 4 also redefines the reset command by using a next sequence of counts and resets the failure count. The first sequence 80 returns to the SEND REGULAR COMMAND step 84 for the controller 4 to next send another regular command to the IC 8*a*.

The IC 8*a* in the above-described embodiments performs a second sequence 100 of steps 102-114 as shown in FIG. 3. The second sequence 100 starts in a START2 step 102, wherein the IC 8*a* initializes and also uses the first sequence of counts for defining the reset command. The second sequence 100 next proceeds to a RECEIVE COMMAND step 104, wherein the IC 8*a* receives the signals sent by the controller 4. The sequence 100 next proceeds to a COMMAND IS A RESET COMMAND? decision step 106, wherein the IC 8*a* determines if the signals represent a reset command. The IC 8*a* may carry out this step using the state transition machine 30 described above, more specifically, the transitions from the IDLE state 32 to the MEASURE3 state 44 in the state transition machine 30. If it is determined in this decision step 106 that the received command is not a reset command defined by the signals 50 and 70 in FIG. 2, the second sequence 100 proceeds to a PROCESS REGULAR COMMAND step 108, wherein the IC 8*a* processes the regular command and responds to the controller 4 accordingly. If it is however determined in this decision step 106 that a reset command is received, the second sequence 100 proceeds to an ID MATCH? step 110, wherein the IC 8*a* determines if an identity information 66 carried in the data signal 50 and the clock signal 70 matches an identity of the IC 8*a*. This step 110 may again be performed as part of the state transition machine 30 described above. If the identity information does not match the identity of the IC 8*a*, the second sequence 100 returns to the RECEIVE COMMAND step 104. If however it is determined that there is a match, the second sequence 100 proceeds to a COMMAND TO REDEFINE RESET COMMAND RECEIVED? decision step 112, wherein the IC 8*a* determines if signals 50, 70 sent by the controller 4 in the step SEND COMMAND TO REDEFINE RESET COMMAND has been received. If it is determined that the particular signals 50, 70 have not been received, the second sequence 100 proceeds to the EFFECT RESET step 114. If however it is determined that the particular signals 50, 70 have been received, the second sequence 100 proceeds to a REDEFINE RESET COMMAND step 116, wherein the IC 8*a* uses the second sequence of counts to define the reset command. The second sequence 100 then proceeds to the EFFECT RESET step 114. In the EFFECT RESET step 114, the IC 8*a* effects a reset function and the second sequence 100 returns to the RECEIVE COMMAND step 104.

While this detailed description has set forth some embodiments of the invention, the appended claims cover other embodiments of the present invention which differ from the described embodiments according to various modifications and improvements. For example, although it is described in the embodiment that the IC 8*a* has no separate reset input, the invention may also be embodied in an IC 8*a* that has a separate reset input. In such an embodiment, the method described above is not the sole method, but an alternative or additional method for effecting a reset function. Each IC 8*a*-8*d* may further include one or more group identity and/or a global identity. In other words, each IC 8*a*-8*d* may belong to one or more groups. The controller 4 may effect a function on ICs belonging to a group based on the group identity. The controller may also effect a function on all ICs by including the global ID in the data signal 50 and clock signal 70.

As another example, the second pulses 74 are described to be that of a clock signal 70 on a clock signal path 14. However, these pulses 74 may be generated on a second data path (not shown) instead. Alternatively, the second pulses 74 may be generated internally in the IC 8*a*.

As a further example, the MEASURE windows 52-62 of the data signal 50 are of different durations and the transitions of the clock signal 70 are at regular intervals in the above described embodiment. However, it should not be construed to be limited as such. For example, the MEASURE windows 52-62 of the data signal 50 may have the same duration and the transitions of the clock signal 70 are at different intervals to obtain the same sequence of transition counts. It is also described that the second pulses 74 of the clock signal 70 are generated in bursts 72 coinciding with the MEASURE windows 52-62 of the data signal 50 and not generated in between the MEASURE windows 52-62. However, the second pulses 74 may instead be continuously generated regardless of the state of the data signal 50.

In the above described embodiment, the sequence of transition counts includes a total of six counts. However, the invention will work with a sequence of at least two counts. And instead of merely counting the number of signal transitions of a single clock signal 70 during a MEASURE window 52-62, the invention may count the signal transitions of more than one signal during each MEASURE window 52-62.

Although it is described that the method is used to effect a reset function, it is not to be construed to be limited as such. The method may be used to effect any type of function. The method may be extended to effect different functions on a single IC 8a using different count sequences. The count sequences for each function may also be redefined as described above.

Within the appended claims, unless the specific term "means for" or "step for" is used within a given claim, it is not intended that the claim be interpreted under 35 U.S.C. 112, paragraph 6.

What is claimed is:

1. An integrated circuit (IC) comprising:
   circuitry for receiving a command that is defined by a first sequence of counts of signal transitions of a first signal during windows of a second signal; and
   circuitry for effecting a function when it is determined that the command is received,
   wherein the second signal comprises a pulse train having a plurality of decreasing duration windows separated by constant spaces, and wherein the first signal comprises a decreasing number of counts corresponding to each decreasing duration window of the second signal.

2. An IC according to claim 1, wherein the circuitry for effecting a function comprises circuitry for effecting a reset function.

3. An IC according to claim 2, wherein the circuitry for effecting a reset function comprises a circuitry for generating a reset signal.

4. An IC according to claim 1, wherein the first signal and the second signal comprise one of:
   the windows in the second signal are of different periods and the transitions of the first signal are at regular intervals; and
   the windows in the second signal have the same period and the transitions of the first signal are at different intervals.

5. An IC according to claim 1, wherein at least one of the first signal and the second signal is received over a signal path external to the IC.

6. An IC according to claim 5, wherein the IC has no external reset input.

7. An IC according to claim 1, further comprising:
   circuitry for determining that the command is received at least twice consecutively; and
   circuitry for defining the command by a second sequence of counts that is different than the first sequence of counts when it is determined that the command is received at least twice consecutively.

8. An IC according to claim 7, wherein the second sequence of counts is hardcoded in the IC or received as part of the first signal or second signal during operation.

9. An IC according to claim 1, wherein the circuitry for effecting a function when it is determined that the command is received comprises circuitry for effecting a function when it is determined that the command is received and an identity of the IC matches an identity information that is included in at least one of the first and second signals.

10. A device comprising:
    circuitry for receiving a command that is defined by a first sequence of counts of signal transitions of a first signal during windows of a second signal; and
    circuitry for effecting a function when it is determined that the command is received,
    wherein the second signal comprises a pulse train having a plurality of decreasing duration windows separated by constant spaces, and wherein the first signal comprises a decreasing number of counts corresponding to each decreasing duration window of the second signal.

11. A device according to claim 10, further comprising:
    circuitry for determining if the command is received at least twice consecutively; and
    circuitry for defining the command by a second sequence of counts that is different than the first sequence of counts when it is determined that the command is received at least twice consecutively.

12. A device according to claim 10, wherein the device comprises an imaging device.

13. A system comprising:
    a device comprising:
    circuitry for receiving a command that is defined by a first sequence of counts of signal transitions of a first signal during windows of a second signal;
    circuitry for effecting a function when it is determined that the command is received comprising circuitry for effecting a reset function;
    circuitry for determining that the command is received at least twice consecutively;
    circuitry for changing the first sequence of counts to a second sequence of counts that is different than the first sequence when it is determined that the command is received at least twice consecutively; and
    a controller coupled to the device that sends at least part of the command to the device,
    wherein the controller comprises:
    circuitry for determining that the device is not effecting the reset function after receiving the command from the controller; and
    circuitry for sending the command to the device at least twice consecutively when the controller determines that the device is not effecting the reset function; and
    wherein the device further comprises:
    circuitry for defining the command by a second sequence of counts that is different than the first sequence of counts when it is determined that the command is received at least twice consecutively.

14. A method comprising:
    receiving a command that is defined by a first sequence of counts of signal transitions of a first signal during windows of a second signal; and
    effecting a function when it is determined that the command is received,
    wherein the second signal comprises a pulse train having a plurality of decreasing duration windows separated by constant spaces, and wherein the first signal comprises a decreasing number of counts corresponding to each decreasing duration window of the second signal.

15. A method according to claim 14, wherein effecting a function comprises effecting a reset function.

16. A method according to claim 14, further comprising determining if the command is received at least twice consecutively; and defining the command by a second sequence of counts that is different than the first sequence of counts when it is determined that the command is received at least twice consecutively.

* * * * *